United States Patent Office 3,438,201
Patented Apr. 15, 1969

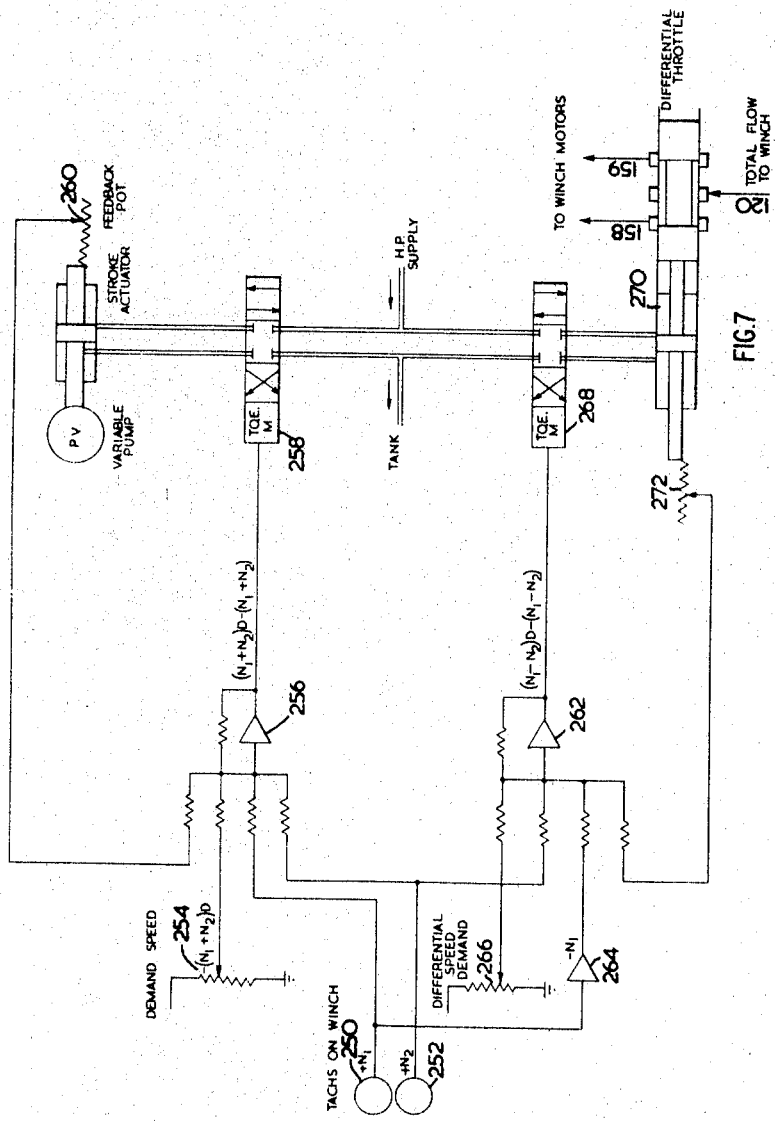

3,438,201
HYDRAULIC-MECHANICAL POWER
TRANSMISSION SYSTEM
John E. Nash, Fredericton, New Brunswick, Canada, Henri
J. Medenblik, Eindhoven, Netherlands, and Lyndon
A. Thomas and Graham H. Wilstead, Fredericton, New
Brunswick, Canada, assignors to The New Brunswick
Research and Productivity Council, Fredericton, New
Brunswick, Canada
Filed July 12, 1967, Ser. No. 652,849
Int. Cl. F16h 39/48
U.S. Cl. 60—52
23 Claims

ABSTRACT OF THE DISCLOSURE

A system for transmitting power from a prime mover which runs at speeds subject to random variation to one or more motors each of which must have a predetermined output speed. The prime mover drives a plurality of positive displacement hydraulic pumps and the latter are connected via valving and conduit means to one or more positive displacement hydraulic motors such that the latter are driven at speeds dependent upon the flow rate of fluid therethrough. A control system sensitive to a signal representing the speed at which the prime mover drives the pumps and to a signal representing a desired hydraulic motor speed and responding to a difference therebetween, produces control signals which are fed to the valving means. The valving means are arranged to respond to such signals by effectively varying the number of pumps feeding fluid to the motor by diverting the total flow output of one or more pumps back to a source in a sense as to cause the actual motor speed to approach the desired speed. A further flow varying system is provided to cause the motor speed to assume the predetermined or set speed. In one embodiment this includes a bypass valve connected in the conduit between the pumps and the hydraulic motor, the bypass valve arranged to respond to a signal representing the desired motor speed and a signal representing the actual motor speed by diverting a portion of the output of the pumps (after the number thereof actually feeding fluid to the motor means has been varied as described above) back to the source. In other systems the further flow varying system includes a variable displacement pump, the latter being arranged to respond to signals representing the desired and actual motor speeds by increasing or decreasing the total flow to the motors such that the output speed of the latter corresponds to the desired speed. A system for automatically maintaining a predetermined speed differential between two or more hydraulic motors regardless of variations in the loads carried thereby is also described.

---

This invention relates to improvements in power transmission systems incorporating both hydraulic and mechanical means.

This invention more particularly relates to combination hydraulic and mechanical power transmission systems of the type wherein there is provided a prime mover, pumping means driven by the prime mover, and fluid driven motor means connected to said pumping means via suitable fluid conductor means. The systems of the present invention are of general applicability, but they are particularly suited to situations wherein the prime mover operates at speeds subject to wide variation, and wherein the periods of maximum and minimum speeds of the prime mover cannot be arranged to correlate with the periods wherein maximum and minimum demands are placed on the motor means. Such a situation arises for example, on a ship wherein the ship's main engine is the prime mover used to drive the pumps, with the motor means (usually more than one) being utilized to operate winches and the like at any desired speed. In this situation it is quite obvious that the periods of peak demand on the winch motors will seldom, if ever, coincide with the periods of peak speed of the ship's main engine. It is apparent that situations of this nature demand that means be provided whereby the desired amount of hydraulic fluid may be fed to the fluid motor to maintain the speed of the latter at any selected value regardless of the speed of the prime mover.

Using the hydraulic-mechanical approach the solution to the problem outlined above could be had in several different ways: Firstly, it would be possible to utilize variable speed gear boxes between the prime mover and the pumping means and/or between a constant displacement fluid motor and the load driven thereby. Unfortunately, variable speed gear boxes are expensive, present maintenance problems, and are not very well suited to automatic control techniques. A second approach known in the art would be to provide a variable displacement pump in conjunction with a fixed displacement motor. This approach might be satisfactory provided the speeds of the prime mover and the load driven by the motor do not fluctuate over wide ranges. However, for many applications, the cost of the pump and fluid motor required becomes prohibitive due to the size of equipment required to handle the maximum pressures and flow rates over the desired speed ranges.

The present invention provides a system capable of pumping the desired flow of hydraulic fluid to the user (e.g., hydraulic motor) at all times and which is substantially independent of the speed of the prime mover utilized to drive the pumping means. The system of the present invention also incorporates a control system capable of maintaining the actual rate of flow through the fluid motor in substantial conformity with the desired flow rate (as determined by the selected speed setting for the motor).

The power transmission systems of the present invention will include a plurality (two or more) of fixed displacement pumps, the latter, as is well known in the art, being capable of pumping a working fluid at rates proportional to the speeds at which they are driven. The system will, of course, include a source of working fluid and the source will be connected by suitable conduit means to the inlets of the positive displacement pumps. A prime mover is provided for driving the fixed displacement pumps and it should be noted here that it is not necessary that the prime mover drive the pumps at any one preselected speed. In fact, the present invention, as mentioned above, is particularly suited for use in situations wherein the prime mover is driven at speeds which may be subject to random variations. The system will also include a suitable user for the hydraulic fluid being pumped and in the system with which we are particularly concerned here the user preferably comprise one or more fixed displacement motors. Such fixed displacement motors will be driven at a rate proportional to the flow rate of the working fluid passing therethrough. To convey the working fluid there is provided suitable fluid conductor means for establishing connection between the outlets of the fixed displacement pumps and the inlet of the user which in this case comprises one or more fluid driven motors. Means are provided for selectively diverting the flow output of the fixed displacement pumps away from the fluid driven motor and thence back to the source of working fluid. In the system to be described hereinafter these means comprise bypass valves which are connected in the fluid conductor means in advance of the fluid driven motor means, the bypass valves constructed and arranged to selectively divert the flow output of the pump associated therewith back to the source with no pressure rise across the pump other than that occasioned by friction losses in the various fluid conduits.

A control means is provided for the bypass valve means and such control means is constructed and arranged such that it is sensitive to a differential between a signal representative of a preselected motor speed setting and a signal representative of the rate at which the fixed displacement pumps are driven, with the control means emitting an error signal in response to any difference between the previously mentioned signals. The signal representative of the rate at which the pumps are driven may be generated as a direct function of the speed of the prime mover by coupling a tachometer-generator to the latter. The signal representing the preselected speed setting is usually obtained from some form of manual control means, e.g., a potentiometer or the like so that the operator can readily change the speed setting of the fluid driven motor.

The power transmission system of the present invention includes a means for feeding the error signal output of the controlling device to the bypass valve means thereby to actuate the latter and hence effectively vary the number of pumps which are feeding the working fluid to the fluid driven motor. The control system and the bypass valve means are constructed and arranged such that the error signal actuates the bypass valve means in a sense tending to reduce the error signal as closely as possible to a null value.

It will be apparent to those skilled in the art that if the number of fixed displacement pumps provided in this system is relatively large, then the actual flow output from such pumps can be made to approximate fairly closely a desired fluid flow to the motor means and hence a desired or preselected motor speed setting. For example, if a system were provided with five constant displacement pumps it should then be possible, by selecting the number of pumps to achieve a fluid flow rate to the motor which is within plus or minus 10% of the desired fluid flow rate. If a system utilizing 10 constant displacement pumps were provided then it would be possible to obtain an actual fluid flow rate and hence an actual motor speed which is within plus or minus 5% of a preselected or desired setting.

In most cases it is entirely impractical and too costly to attempt to achieve the required accuracy of flow variation solely by means of varying the number of constant displacement pumps feeding hydraulic fluid to the motor. Accordingly, the present invention provides in a further aspect a further flow varying means which is responsive to any remaining difference between the actual rate of flow to the motor means and the desired flow rate (and hence desired motor speed) after the number of constant displacement pumps actually feeding working fluid to the motor means has been varied by means of the control system acting in conjunction with the bypass valve means referred to previously. The so-called further flow varying means are constructed and arranged to act in response to any such remaining difference as outlined above and to reduce such difference substantially to a 0 value.

The further or additional flow varying means referred to above may be of several different varieties. In one form, the further flow varying means includes a variable restriction positioned in the fluid conductor means referred to previously whereby the flow from the constant displacement pumps passes therethrough. A fluid bypass line is connected to the fluid conductor in advance of the variable restriction and also to the source of fluid, a bypass valve is connected in the bypass line, such valve including a valve actuating means responsive to the pressure drop across the restriction. The valve actuating means operates in a feed-back sense in response to changes in the pressure drop whereby increasing flow through said restriction and hence increasing pressure drop tends to open said valve to bypass more fluid back to said source and vice-versa. Effectively then, the further flow varying means bypasses the difference in flow which exists between the flow required by the motor to achieve a predetermined or set speed and the flow supplied by the constant displacement pumps (after the number thereof actually pumping fluid to the motor means has been varied by the control means and the first mentioned bypass valve means), and rejects the difference in flow back to the source of working fluid.

The restriction in the main fluid conductor referred to above is in several of the embodiments of variable nature and acts as a speed control for the fluid motor. It should be realized that the variable restriction is by no means essential and in fact gives rise to inefficiencies in the system. Accordingly, systems will be described hereinafter wherein the variable restriction means in the main fluid conductor is completely eliminated and substituted by other suitable means.

The fluid flow restrictor means and associated pressure differential-operated bypass valve referred to above is adequate in systems having a total output power of less than approximately 80 horse power. If power requirements rise above this level heat losses in the system by virtue of the restriction and the throttling at the pressure sensitive bypass valve represent a considerable loss of efficiency and a different form of flow varying means to offset the difference between the flow actually delivered by the constant displacement pumps and the flow actually required is needed. Accordingly, in a further aspect of the present invention, there is provided, in addition to the constant displacement pumps previously referred to, a variable displacement pump, the latter being controlled such that its output together with the combined outputs of some or all of the fixed displacement pumps equals the total fluid flow demanded by the fluid driven motor means. The displacement of the variable displacement pump may be changed or controlled in several different ways. In one of the embodiments to be described hereinafter a restriction is placed in the fluid conductor which connects the pump outlets to the inlet of the fluid motor and the pressure drop across such restriction used to control, in a feed back sense, the displacement of the variable displacement pump. If the flow to the hydraulic motor is greater than that demanded the control system acts to decrease the displacement of the additional pump and vice versa. In certain other embodiments the variable displacement pump or alternatively a bypass valve is controlled by a signal responsive to a difference between a signal generated by the motor means and a signal proportional to a desired speed setting.

It should be realized that one or several fluid motors may be incorporated in the systems of the present invention. The present invention also provides for the operation of one or several motors either at the same speed or at different speeds. One embodiment of the system which will be described later provides for differential speed selection and includes a control means which permit differential speed operation at preselected ratios even when different loads are being carried in the separate motor systems.

Specific embodiments of the invention will now be described with reference to the accompanying drawings.

FIGURE 7 illustrates a modified form of control system specially adapted for use with a system illustrated in FIGURE 6 which permits differential speed operation of a pair of hydraulic motors regardless of the loads carried by the latter.

Figure 1:
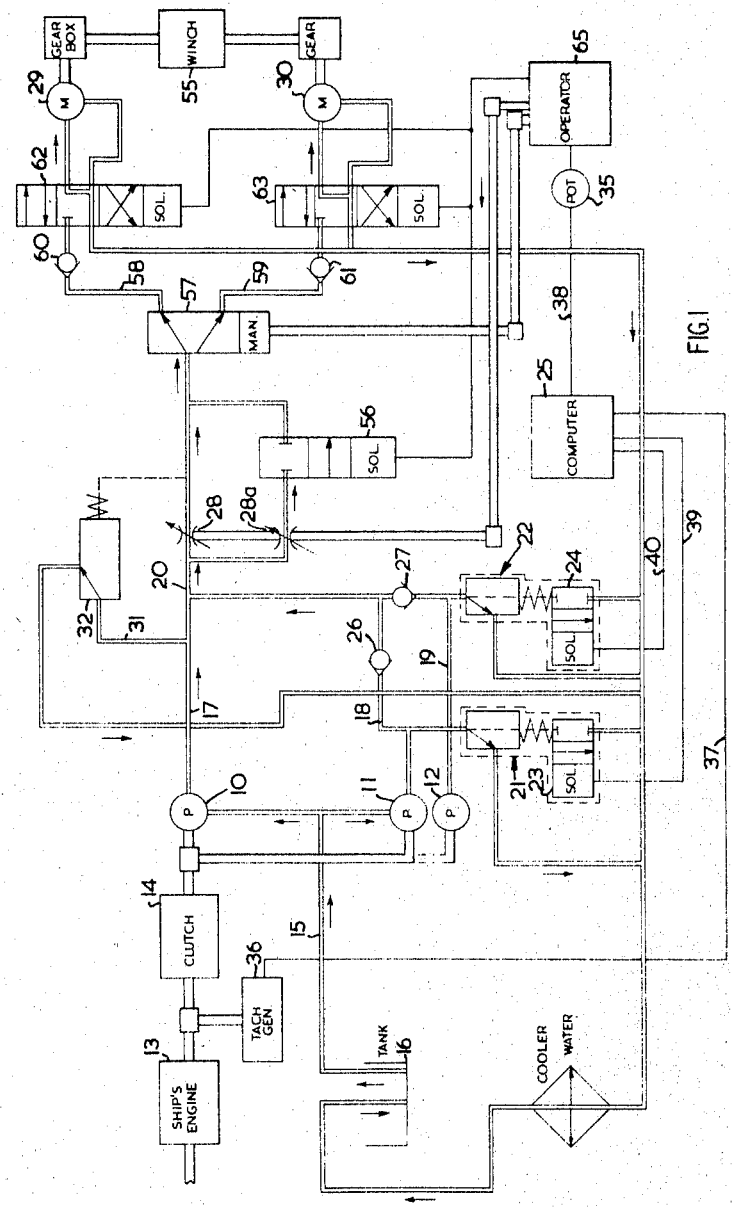
FIGURE 1 represents a first embodiment of the present invention including a plurality of fixed displacement pumps, all but one having bypass flow means associated therewith, specially adapted for driving one or more hydraulic motors at preselected speeds regardless of the speed at which said pumps are driven.

Referring now to FIGURE 1 there is seen a plurality of fixed displacement pumps 10, 11 and 12, which are geared directly to a prime mover, which in this case is ships engines 13, via a suitable clutch, e.g., dog clutch 14. The "fixed" or "constant" displacement pumps referred to may be of the rotary type (e.g., gear, lobe or vane) or alternatively they may be of the reciprocating piston and cylinder variety. The use of hydro kinetic pumps (e.g., centrifugal pumps) is not contemplated in the present invention. The inlets of pumps 10, 11 and 12 are connected to a common line 15 which leads from a suitable source of hydraulic fluid shown at 16.

The outlets of the fixed displacement pumps 10, 11 and 12 are represented by line 17, 18 and 19 respectively. The latter mentioned lines all lead into a common collector conduit 20. Connected downstream of each of the fixed displacement pumps 11 and 12 are solenoid operated dumping relief valves 21 and 22 respectively. Each of the latter mentioned valves 21 and 22 include, in one casing, solenoid actuated two-way valves 23 and 24 respectively. The solenoid valves 23 and 24 receive electrical signals directly from the controller 25. The manner in which the controller 25 functions will be described in fuller detail hereinafter. Each of the dumping relief valves 21 and 22 has a first position in which the flow of the fixed displacement pump associated therewith is bypassed back to the source tank 16 with no pressure rise across the pump other than that required to overcome pipe losses; in the second position of the dumping relief valve the full flow of the pump associated therewith is directed into the collector conduit at whatever pressure the load demands.

It is also to be noted that each of the fixed displacement pumps 11 and 12 have check valves 26 and 27 respectively associated therewith positioned in outgoing lines 18 and 19 respectively. These check valves are positioned in lines 18 and 19 downstream of the points of connection of the dumping relief valves 21 and 22 to lines 18 and 19. The function of the check vales is obvious; they prevent the outgoing flow from any one of the pumps from short-circuiting back to the tank 16 through the dumping relief valve associated with any other one of the fixed displacement pumps when such valve is open.

The total output flow of the pumps 10, 11 and 12 is divided into two paths; the first path leads from the collector conduit 20 through a manually operated variable restriction 28 and thence through suitable valving and conduit means to the fixed displacement hydraulic motors 29 and 30 all of which will be described in further detail hereafter. The second flow path for the pump output leads through a bypass valve 32 via a suitable conduit means 31. The bypass valve 32 is connected across the manually operated restriction 28 thereby to sense the pressure drop thereacross. The bypass valve 32 acts to bypass the difference in flow which exists between the flow selected to operate the fluid motors 29 and 30 and the flow actually supplied by the pumps 10, 11 and 12, with the bypass flow being returned to the tank 16 in the same fashion as any flow passed by dumping valves 21 and 22 is bypassed to tank 16. The bypass valve 32 is arranged, in the manner well known in the art, such that the pressure drop thereacross provided by manually operated restruction drives the bypass valve in a feed-back sense; if the flow through the restriction is too high, more flow is bypassed and vice-versa.

The manually operated restriction (hereinafter abbreviated M.O.R.) is constructed such that the flow through to the hydraulic motors is a linear function of the position of opening of the M.O.R. As a result the control lever position of the M.O.R. is an indication of motor speed. Hence, the control lever position of the M.O.R. could be used to "schedule" in or out (i.e., selectively bypass the output flow of) fixed displacement pumps 11 and 12 thereby to bring the total pump output as closely as possible to the actual flow required to produce a desired hydraulic motor speed as determined by the setting of the M.O.R. with the excess pump output flow being bypassed via the bypass valve 32 back to the tank 16. However, if only the control lever position of the M.O.R. were used to "schedule" the pumps in or out as required, the constant displacement pumps 10, 11 and 12 would have to be driven at one speed only. Since the present invention is particularly concerned with systems wherein the prime mover varies in speed over a range of 3:1, it is then apparent that any such "schedule" must therefore be modified as a function of the speed of the prime mover.

In order that the scheduling "in" and "out" of the pumps in order to match as closely as possible the actual pump flow with the flow demanded by the fluid motors in order that they attain a preselected speed, a simple electrical controller 25 is provided. The controller 25 accepts an electrical signal from the M.O.R. via a potentiometer 35, the wiper arm of the latter being set in accordance with the actual control lever position of the M.O.R. such that the potentiometer emits an electrical signal of strength proportional to the desired hydraulic motor speed (it was stated above that the flow to the hydraulic motors was a linear function of the opening position of the M.O.R.). This can be achieved by mechanically linking the wiper arm of potentiometer to the restrictor means of the M.O.R. such that opening or closing of the latter increases or decreases respectively the strength of the potentiometer signal. The controller 25 also receives a signal representative of the actual drive speed of the pumps 10, 11 and 12. This signal is received from a tachometer-generator 36, the latter being coupled and driven directly from the engine 13. The signals from the "tacho"-generator 36 and the potentiometer 35 are fed into the controller 25 via lines 37 and 38 respectively. The controller 25 responds to differences between these two signals by emitting control signals which are fed to the solenoids of the servo operated dump valves 21 and 22 via suitable electrical leads 39 and 40 respectively.

The control system for the solenoid operated dumping valves 21 and 22 will now be more fully described with reference to FIGURE 2. The potentiometer 35 which, as mentioned previously, may be mechanically coupled to the M.O.R. 28 such that the potentiometer position is adjusted in accordance with the position of opening of the M.O.R., produces a signal, the strength of which represents the actual flow setting of the M.O.R. 28. The output signal from the potentiometer is fed to a first input of each of a pair of differential comparators 45 and 46. The other input of each of the differential comparators 45 and 46 receives a signal which is proportional in strength to the pump prime mover speed, i.e., the speed of engine 13. This signal is generated, as we have seen previously, by means of a tacho-generator 36 which is coupled directly to the engine 13. The differential comparators 45 and 46 emits a signal only when the voltage received from the tacho-generator 36 is greater than the voltage received from the potentiometer 35. Hence, with decreasing prime mover speed or alternatively rising flow demand by the fluid motors with the result that the signal from the potentiometer 35 becomes greater than the signal from the tacho-generator 36, an output is obtained from one or other of the comparators 45 and 46. The outputs of the differential comparators 45 and 46 are connected to respective silicon controlled or equivalent rectifiers 47 and 48 respectively. When operating, the output of the comparators 45 and 46 act to "gate" the silicon controlled rectifiers 47 and 48, the latter in turn acting to pass rectified A.C. current from the sources S1 to the coils of the respective solenoid valves 21 and 22. The electrical signals fed to the solenoids of either the dump valve 21 or 22 actuates the latter so that the bypass flow therethrough is stopped. Hence the output of the constant displacement pump associated with such energized solenoid operated dump valve is forced to pass through the common collector conduit 20 hence increasing the flow of hydraulic fluid to the fluid motors. When the solenoid of dump valve 21 or 22 is deenergized it bypasses the output flow of the pump associated therewith back to tank 16 hence decreasing the flow of fluid to the hydraulic motors. Since it would be highly undesirable if both of the positive displacement pumps 11 and 12 were "switched on line" at the same time, a plurality of resistors of varying values, i.e., resistors 50, 51, 52 and 53 are inserted into the input lines to the comparators 45 and 46 thereby to select the switching points of the latter at any preselected voltage values as developed by the potentiometer 35 and the tacho-generator 36. Those skilled in the art will be readily able to compute the value of the resistances required in order to bring the constant displacement pumps "in line" in any preselected sequence. It should also be noted here that a small hysteresis band is built into each of the comparators by feeding back a portion of their respective outputs to their respective inputs; this prevents hunting of the system when the latter is operating very near to the pump selection points.

Figure 2:
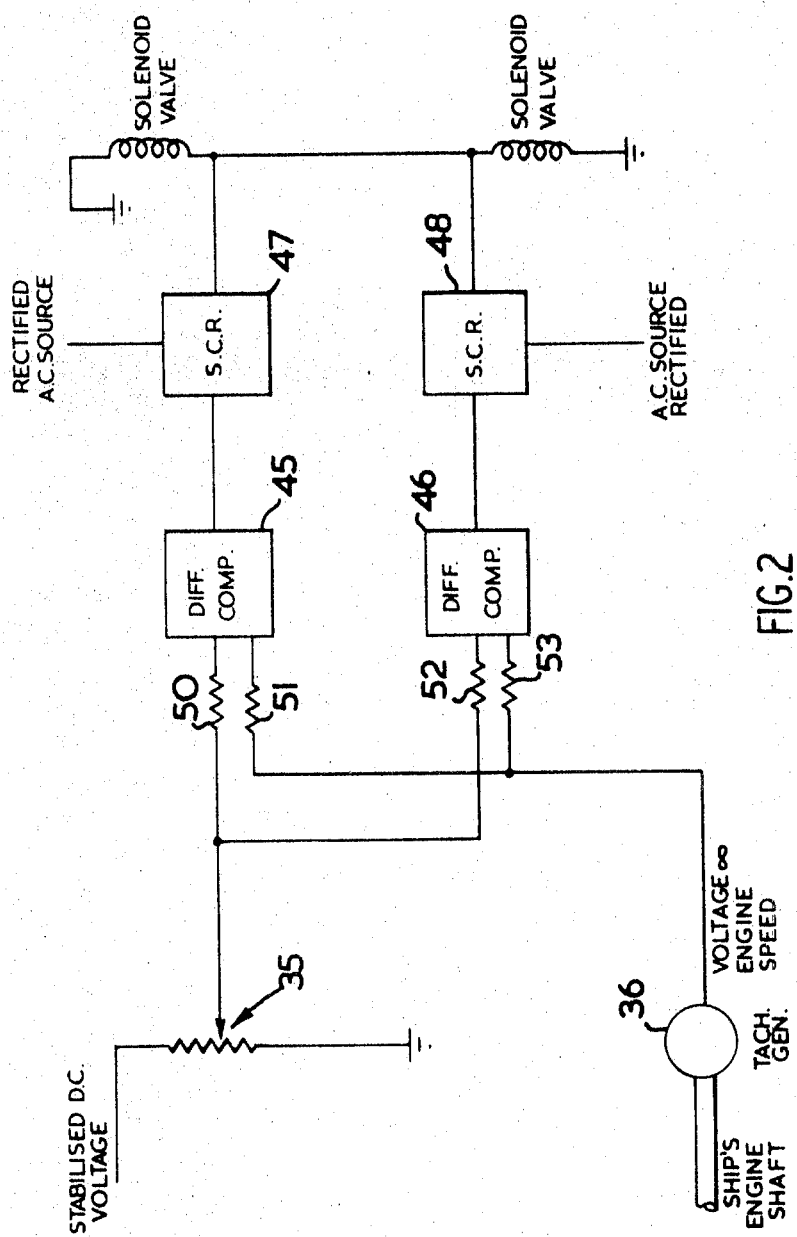
FIGURE 2 illustrates the control system used for controlling the bypass flow means associated with the fixed displacement pump.

It will be realized that the system shown in FIGURE 2 is especially adapted for use with a system incorporating three fixed displacement pumps wherein provision is made for the sequential selection of two of such pumps in order to match as closely as possible the actual pump output with the demanded or preselected output. Those skilled in the art will realize of course that a system could be provided wherein provision is made for the sequential selection of several, say five or six, constant displacement pumps, each of the latter having a servo operated dump valve connected to the output thereof. For each such pump there would be provided a differential comparator having a silicon controlled rectifier or other equivalent means associated therewith. The inputs to each of the differential comparators would be provided with suitable resistance means such as shown in FIGURE 2 such that the pumps would be activated and deactivated in a predetermined sequence.

The system shown in FIGURE 1 includes, as we have seen previously, a pair of motors 29 and 30 the latter being connected to suitable gear box means thereby to drive a winch represented as 55. The hydraulic motors contemplated for use in the present invention comprise fluid driven motors of the positive displacement variety, e.g., gear motors, reciprocating piston and cylinder type motors wherein the output speed of the motor is determined solely by the flow rate of hydraulic fluid therethrough regardless of the load on the motor. If the motors 29 and 30 are to be run independently, or alternatively together, the pump selection schedule is further complicated. If the hydraulic motors 29 and 30 are of the same size and if one of such motors is running then the flow required is half that for two of such motors running at the same speed. This problem is overcome by providing an additional M.O.R. 28a connected in parallel with the first mentioned M.O.R. 28. The second M.O.R. is provided with a solenoid operated on-off valve 56 which permits M.O.R. 28a to be switched in or out of the system depending on the demand of the motors 29 and 30 for fluid.

It will also be appreciated that a further electrical signal must be fed into the controller 25 concurrently with the activation of the second M.O.R. 28a such that the controller will immediately bring more pumps "on line" in order to accommodate the extra flow demanded by the second motor. This could be done by increasing the apparent strength of the signal from the potentiometer 35, e.g., by decreasing the size of the resistances 50 and 52 or by increasing the total voltage across the potentiometer winding.

The system of FIGURE 1 also includes a further means which permits differential speed operation of the two motors 29 and 30. This consists of a manually operated flow dividing valve 57 which differentially throttles the separate branch lines 58 and 59 leading to the respective fluid motors 29 and 30. To allow for the fact that one motor load may demand the higher torque than the other, one way check valves 60 and 61 are inserted in the respective fluid lines 58 and 59. The check valves 60 and 61 ensure that the motor having the higher pressure demand is held in hydraulic lock until the flow divider 57 throttles the other motor to a sufficiently high degree.

Also shown in FIGURE 1 are means for reversing the hydraulic motors 29 and 30 either separately or together. These means comprise solenoid operated four-way valves 62 and 63 which are associated respectively with motors 29 and 30. The four-way valves 62 and 63 effectively reverse the order in which the ports of the motors 29 and 30 are connected to the supply lines 60 and 61 respectively and the hydraulic fluid return line which leads back through to the supply tank 16.

The system of FIGURE 1 also illustrates an operator's control panel 65 from which the operator exercises full control over the complete system including manual control of one or both of the M.O.R.'s 28 and 28a, control over the manual operated flow dividing valve 57 and the on-off valve 56 as well as control over the motor reversing valves 62 and 63. The actual form which the control means for the various valves mentioned above takes is not shown in detail in FIGURE 1 since it is believed that control means suitable for these devices are well known in the art.

In the system described above the controller receives signals from a tacho-generator coupled to the prime mover and a signal representative of the opening position of a manually operated restriction positioned in the main fluid conductor between the fixed displacement pumps and the motors driven thereby. The controller was constructed to respond to these signals and emit control signals which were fed to the solenoid operated dump valves connected to the outlets of one or more of the positive displacement pumps in order effectively to activate or deactivate the same to increase or decrease the available total supply of working fluid to the motor. Any difference remaining between the flow supplied by the pumps and the flow demanded by the motors after the appropriate number of pumps were activated or deactivated, as the case may be, was made up by means of the bypass valve 32 which rejected the difference in flow back to the source of hydraulic fluid. A modified system is shown in FIGURES 3 and 3A and it is capable of achieving essentially the same results as the system of FIGURES 1 and 2 although in somewhat different manner.

Figure 3:
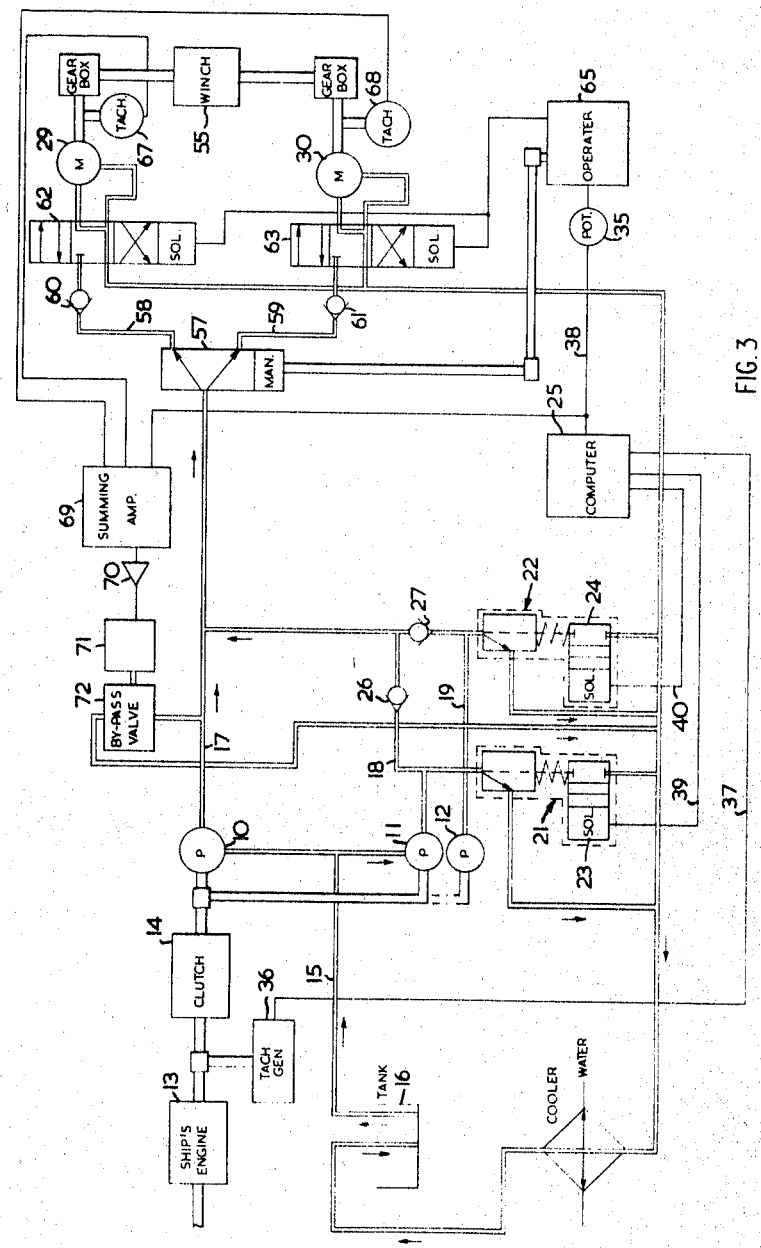
FIGURES 3 and 3A illustrate a modified system which utilizes the same control means as the system of FIG. 1 for scheduling the fixed displacement pumps, but controls the remaining difference in flow, after the fixed displacement pumps have been scheduled, in a somewhat different fashion.
Figure 3A:
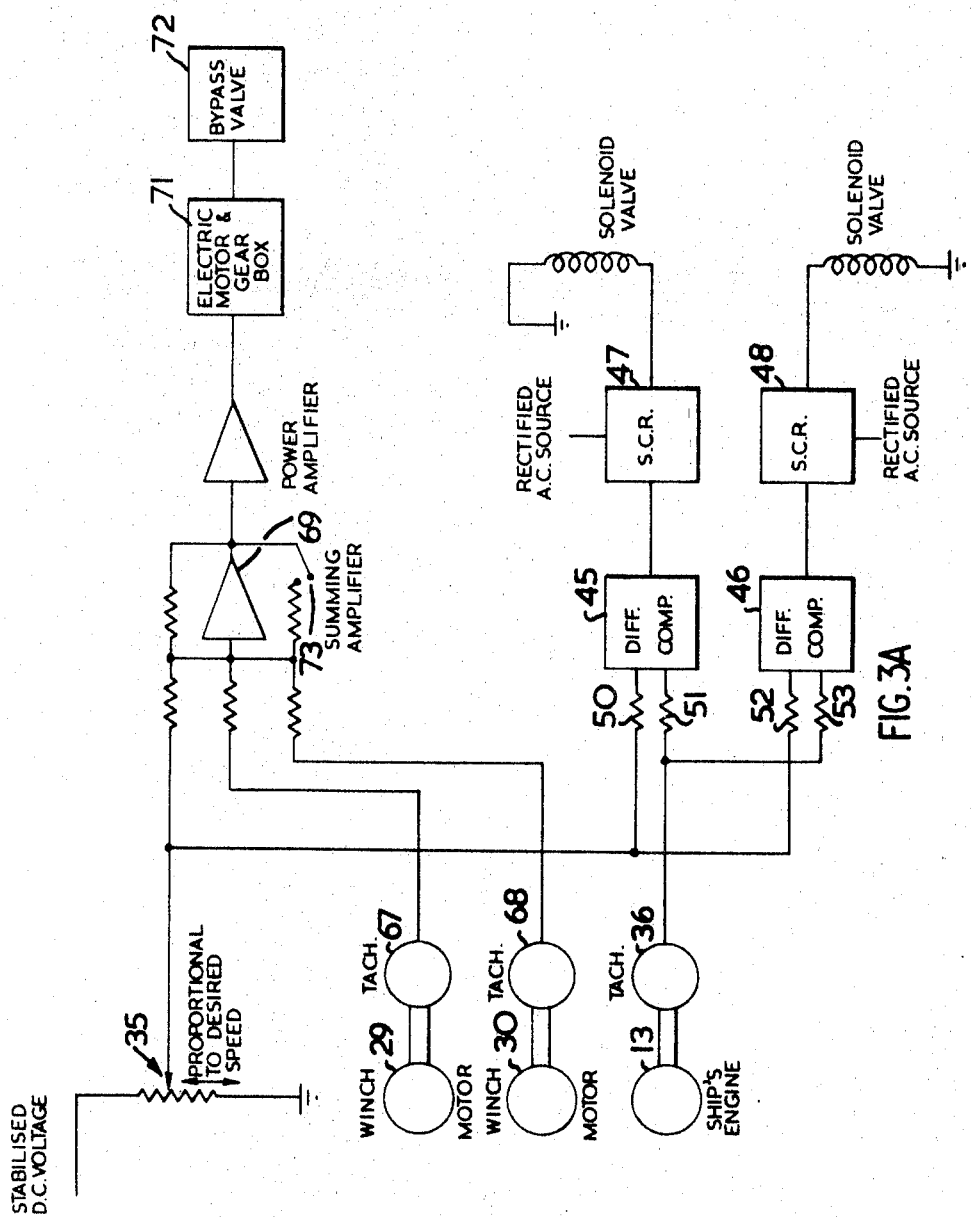

Much of the system shown in FIGURES 3 and 3A is identical to that shown in the system of FIGURE 1 and like components have been given identical numerical designations in both these figures. The system of FIGURES 3 and 3A includes the tachometer-generator 36 coupled to the ship's engine 13, the output of the tacho-generator 36 being fed to one input of each of the differtial comparators 45 and 46 as described previously. The remaining inputs of the differential comparators 45 and 46 are connected to the wiper arm of the potentiometer 35 the latter being set manually by an operator in accordance with the desired motor speed setting. The outputs of the differential comparators are fed to the inputs of respective silicon rectifiers 47 and 48 the latter serving, in response to a signal fed thereto from the differential comparators, to connect a rectified A.C. source of power to the windings of the respective solenoids of the dump valves 21 and 22. Also, as described previously, the input lines of the differential comparators are provided with suitable resistors 50, 51, 52 and 53 in order to effect sequential actuation of the dump valve 21 and 22 at any preselected voltage level from tachometer-generator 36 and potentiometer 35. It is therefore seen that the system of FIGURE 3 achieves control of the solenoid dump valve connected to the outlets of the positive displacement pumps essentially in the same manner as does the system of FIGURE 2. However, the system of FIGURE 3 achieves control of the bypass flow without the use of an M.O.R. and the pressure drop associated with it. In FIGURE 1 it was explained how the bypass valve 32 responded to a pressure differential across the M.O.R. 28 in order to divert the difference in flow existing between the flow required and the flow supplied back to the supply tank 16. As illustrated in FIGURE 3 each of the winch motors 29 and 30 have tacho-generators 67 and 68 respectively associated therewith. The voltage output of these two generators together with the voltage output from the potentiometer 35 are fed into a summing amplifier 69 whereby the latter effects a comparison between the voltage output of the tachometer-generator 67, 68 and the desired motor speed voltage as represented by the potentiometer output. The error signal output of the summing amplifier is fed through a power amplifier 70 and the output of the latter is used to drive by means of an electric motor 71 and associated gear box, a bypass valve 72. The system is arranged such that the bypass valve 72 is opened only when the signal indicative of the motor speed is greater than the signal indicative of the desired speed setting. A suitable equivalent to the electric motor and gear box 71 and associated bypass valve 72 would be an electro-hydraulic servo valve in association with a servo-operated bypass valve.

It will be noted from FIG. 3A that the summing amplifier 69 includes a switch means 73 which provides a gain variation of two to one at the summing amplifier thereby to allow for operation of either one or both of the fluid motors 29 and 30. It is assumed here that the two motors 29 and 30 will be required to operate at the same speed as one, with one speed selection position.

It will therefore be seen that the system of FIGURES 3 and 3A achieves control of the pump selection in exactly the same manner as that described in connection with FIGURE 2 with the somewhat inefficient M.O.R. being eliminated.

The first of those systems incorporating a plurality of fixed displacement pumps together with a variable displacement pump in order to achieve a desired flow of hydraulic fluid to the hydraulic motors will now be described with reference to FIGURE 4.

Figure 4:
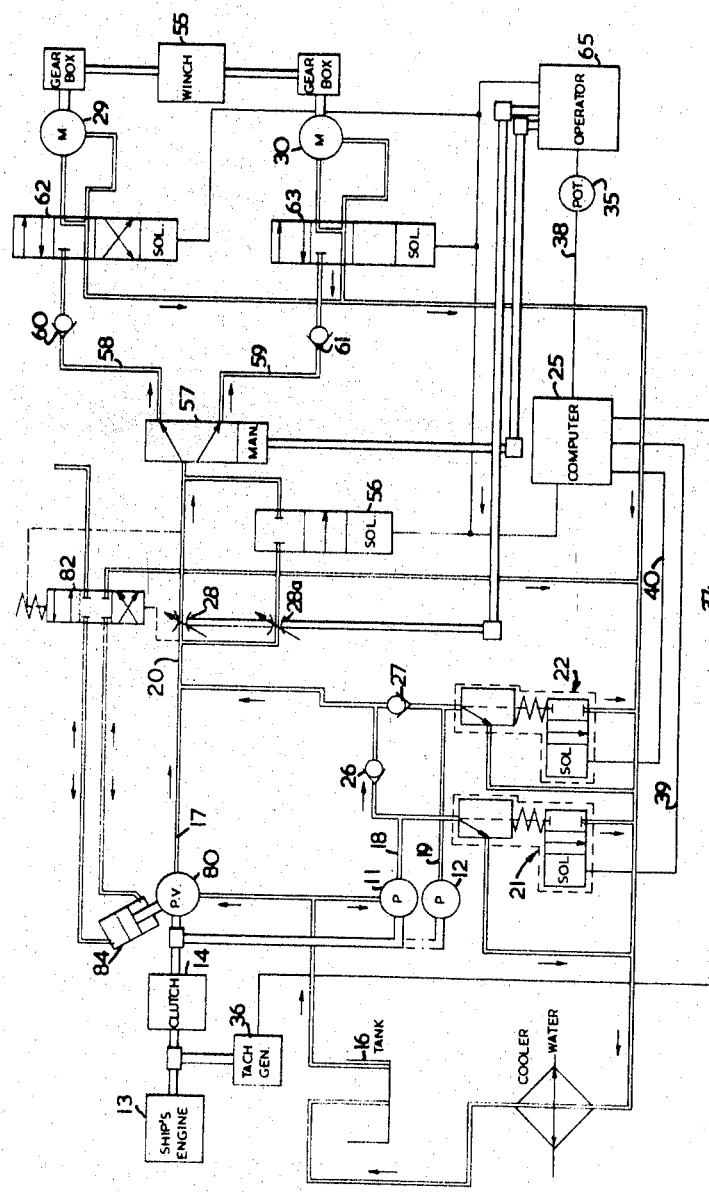
FIGURE 4 is a still further modification of the present invention and includes the use of a variable displacement pump in conjunction with a plurality of fixed displacement pumps in order to provide the desired flow of hydraulic fluid to the hydraulic motor means.

Since much of the system shown in FIGURE 4 is identical to the system shown in FIGURE 1, a full description of the complete system shown in FIGURE 4 will not be given here in order to avoid redundancy. Those portions of the system of FIGURE 4 having the same structure and function as in FIGURE 1 have been provided with identical reference numerals. Referring now to FIGURE 4 it will be seen that there is provided a variable displacement pump 80 and a pair of fixed displacement pumps 11 and 12. All of the pumps are geared to the engine 13 via a suitable clutch 14. As in the system of FIGURE 1 each of the fixed displacement pumps 11 and 12 has downstream thereof respective solenoid operated dumping relief valves 21 and 22 and check valves 26 and 27 respectively. The flow from the fixed displacement pumps and the variable displacement pump 80 passes through a collector conduit 20 at whatever pressure the load on the motors 29 and/or 30 demands. The total flow from the pumps then passes through a manually operated restriction M.O.R. 28, thence through the differential throttle 57, and thereafter is divided in accordance with the differential throttle setting such as to travel through the branch conduits 58 and 59. The branch conduits are provided with check valves 60 and 61 and each of the branch lines is additionally provided with four-way valves 62 and 63 to effect reversal of the fluid motors 29 and 30 in the same manner as described in connection with FIGURE 1.

As with the system of FIGURE 1, the controller 25 receives a signal from the tacho-generator 36 and also from the potentiometer 35. The controller 25 also receives a corrective signal depending on whether or not the solenoid valve 56 is open or closed in order to correct the system for operation of either one or two of the fluid driven motors. The output control signals of the controller 25 are fed via electrical lead lines 39 and 40 to the solenoid dump valves 21 and 22 respectively in order to achieve sequential selection of the fixed displacement pumps 11 and 12 in the same fashion as previously described in connection with FIGURE 1.

The notable feature of the system of FIGURE 4 is that the pressure drop across the M.O.R. 28 is utilized to actuate the setting of a four-way fluid pressure activated valve 82. One port of the four-way valve 82 is connected to an independent high pressure supply of hydraulic fluid while a second port of the valve 82 is connected to the return line to the tank 16. The remaining two ports of the four-way valve 82 are connected to the motor 84, the latter being used to actuate pump 80 in order to change the displacement thereof. Any changes in the pressure drop across the M.O.R. 28 will immediately be sensed by the pressure actuated four-way valve 82 and the latter will pass hydraulic fluid to the differential motor 84 thereby changing the flow output of the pump 80 in such a manner as to keep the pressure drop across the M.O.R. 28 substantially constant. By suitable profiling of the M.O.R. orifice the position of the M.O.R. control lever will have a linear relationship to the total metered flow. The control lever position for the M.O.R. is therefore again used to influence, via a potentiometer 35, the switching schedule for the fixed displacement pumps 11 and 12 exactly as described previously in connection with FIG. 1.

In the systems described with reference to FIGS. 1 and 4 a certain loss in efficiency arises by virtue of the pressure drop incurred across the manually operated restriction means. When relatively high power equipment is to be driven by the system, say involving over 100 H.P., the heat generated from even this source is very considerable and the M.O.R. required becomes large and relatively expensive. The system shown in FIGURE 5 to a large extent obviates this difficulty.

Figure 5:
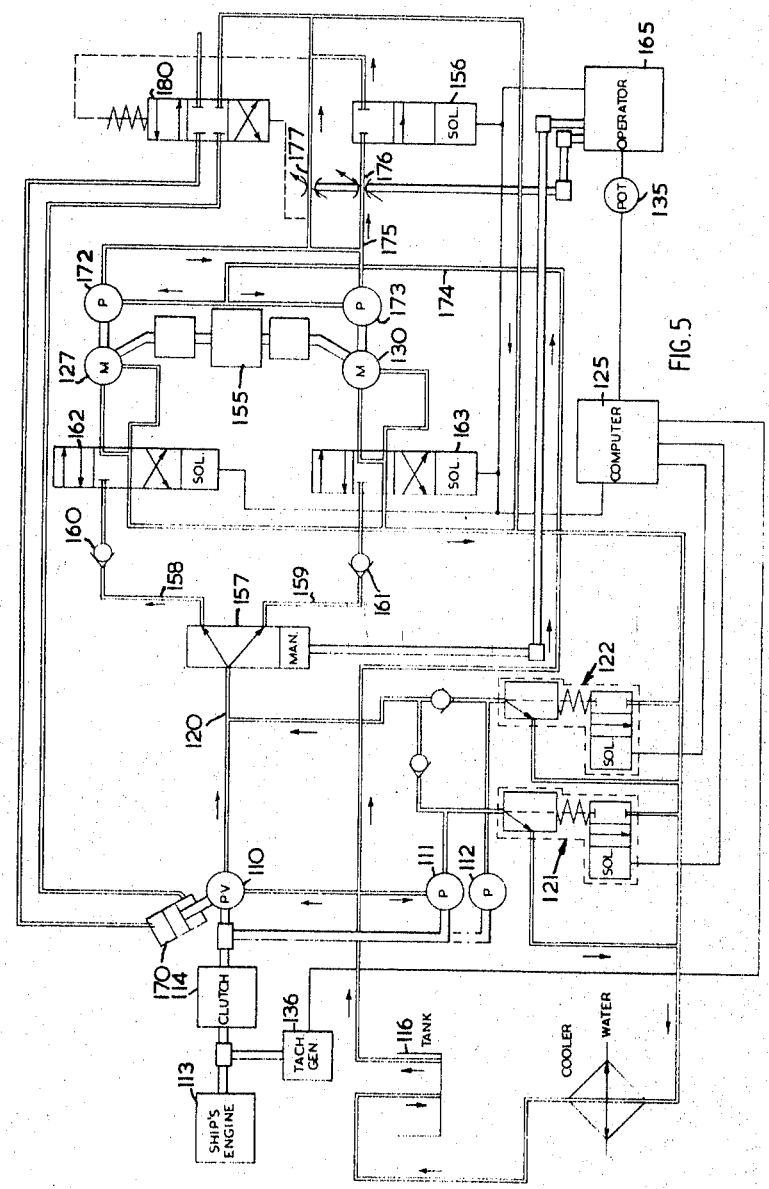
FIGURES 5 and 6 are modified systems according to the present invention and include the use of a variable displacement pump in conjunction with a plurality of fixed displacement pumps in order to provide the desired flow of hydraulic fluid to the constant displacement motor means.

Referring now to FIGURE 5 there is seen a variable displacement pump 110 and fixed displacement pumps 111 and 112 coupled via clutch 114 to an engine 113. The outlets of the three pumps feed into a common main conduit 120. As with the previously described systems, the outlets of the fixed displacement pumps 111 and 112 include respective solenoid operated dumping relief valves 121 and 122 as well as the usual check valve means.

The collector conduit 120 leads into the differential throttle valve 157, the latter having connected thereto the two branch conduits 158 and 159, the latter having therein respective check valves 160 and 161 respectively. The branch lines 158 and 159 lead to the four-way fluid motor reversing valves 162 and 163 respectively and the latter are connected to the ports of the fluid motors 129 and 130. As before, the fluid motors are utilized to drive some suitable load such as the winch mechanism broadly indicated at 155.

To each of the motors 129 and 130 there are coupled small fixed displacement pumps 172 and 173 respectively. These are connected to the source or tank of hydraulic fluid 116 and these pumps deliver a flow of fluid which is proportional to the speed at which the motors 129 and 130 are driven. The flow output of the pumps 172 and 173 passes through a common header 175 and thence through a pair of small manually operated restrictions 176 and 177 connected in parallel. It should be noted here that the manually operated restriction 176 is provided downstream with a solenoid actuated shut off valve 156. When only one of the winch motors is operating the M.O.R. 176 is closed off; concurrently with this, a correction is made in the controller 125 thereby to accommodate the latter for single motor operation in substantially the same manner as described with the previous systems. As a matter of fact, it will be noted that the M.O.R.'s 176 and 177 are, in effect, scaled down versions of those used in the direct flow metering systems previously describes in connection with FIGURES 1 and 4.

A pressure drop controller is connected across the M.R.O.'s; the pressure drop controller is in this instance as in FIGURE 4, a four-way fluid pressure actuated valve. One port of the four-way valve 180 is connected to an independent source of hydraulic fluid pressure while a second port is connected to a return line leading back to the tank 116. The remaining two ports of valve 180 are connected across opposing sides of a differential motor 170, the latter being connected to the variable displacement pump 110 in such a manner as to vary the displacement thereof and retain the pressure drop across the M.O.R.'s 176 and 177 at a substantially constant value. Once again, as with the previously described systems, the orfices of the M.O.R.'s 176 and 177 are profiled to obtain linear control lever movement with flow, and the control lever position is utilized by means of a potentiometer 135 to provide one of the control signal inputs to the controller 125 in order to control the fixed displacement pump switching schedule.

Figure 6:
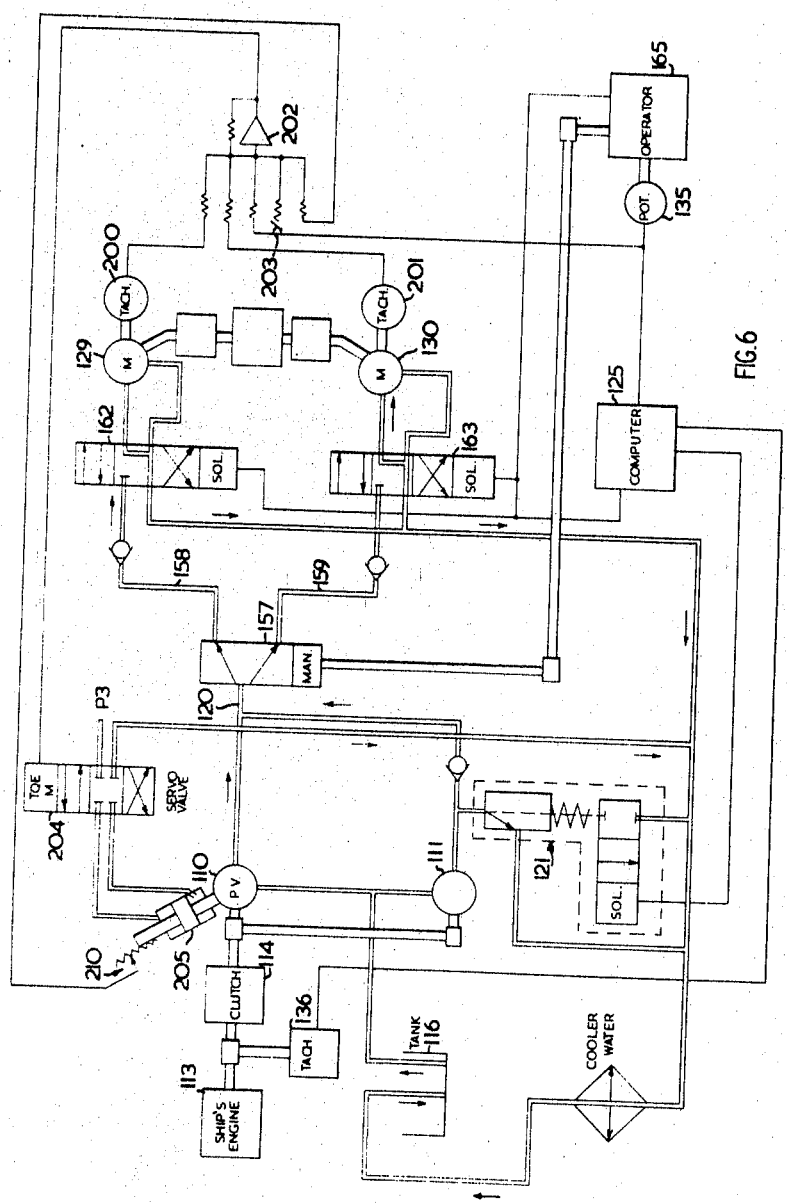

A third form of power transmission system incorporating a variable displacement pump together with one or more fixed displacement pumps is shown in FIGURE 6. This system is exactly the same as the system shown in FIGURE 5 up to and just beyond the fluid driven motors and hence the reference numerals used in both drawings are the same up to this point. The one exception to the foregoing is that only one fixed displacement pump together with associated valving, etc., is shown. As mentioned previously, 1, 2, 3, 4, etc., fixed displacement pumps may be utilized in this system if the latter is provided with appropriate valving and conduit means and also provided appropriate additions are made to the controller 125.

The object of the system shown in FIGURE 6 is to eliminate hydraulic feed back of any kind and to allow the easy introduction of phase shaping functions into the system in the event of stability problems. In order to achieve this objective the system shown in FIGURE 6 incorporates an electrical feed back system in order to achieve control of the variable displacement pump 110. Since the bulk of the system of FIG. 6 is the same as that of FIG. 5, the reference labelling in both systems is the same for identical components.

Referring to FIGURE 6, it is seen that tachometer-generators 200 and 201 are mechanically coupled to the output shafts of the fluid driven motors 129 and 130 respectively. The output voltages of the two tacho-generators are taken to a high gain solid state amplifier 202. Also fed to the amplifier 202 is a voltage proportional to the desired speed of the motors 129 and 130 and such voltage is obtained from the potentiometer 135, the latter being controlled by the operator from a control station 165. These three voltages are summed at the amplifier to give an output error signal proportional to the difference between the desired and the actual fluid motor speed. It will be noted here that the amplifier 202 includes a suitable switch 203 which is utilized to give a two to one gain variation at the amplifier input depending upon whether one or two of the fluid motors are in operation.

The error signal from the amplifier 202 is fed to an electro-hydraulic transducer 204 which in turn controls via a suitable four-way valve means the flow of high pressure hydraulic fluid from an independent source of fluid P3 to the motor 205. The positon of the motor 205 determines the displacement of the variable displacement pump 110.

A potentiometer 210 is operatively associated with the motor 205 and produces a signal of voltage determined in accordance with the setting of the motor 205. The voltage produced by this potentiometer 210 is connected to a suitable resistance means at the high gain amplifier 202 to provide interstage feedback. The manner in which the fixed displacement pumps are controlled is exactly the same as in the systems previously described.

A further control system, which is in effect an extension of the control system shown in FIGURE 6, is outlined in FIGURE 7. In all of the previously described systems, the differential throttle, which was provided in order to enable differential speed operation of the fluid driven motors, was manually operated. The manually operated differential throttle required that the operator have some idea of the loads being carried by the respective motors. In other words, for any one differential throttle setting, the speed ratio between the fluid driven motors would vary in accordance with the loads respectively carried thereby. The system shown in FIGURE 7 effects control of the differential throttle means in such a manner that differential speed selection is achieved without their being any need for the operator to visualize or "feel" the differing loads on the separate motor systems.

Since all of the hydraulic features of the systems shown in FIGURE 7 are exactly the same as those shown in FIGURE 6 except for the differential throttle, only the differential throttle, the variable stroke pump and the control systems therefor are shown in FIGURE 7.

In the system of FIGURE 7 as in the system of FIGURE 6 each of the fluid driven motors have tachometer-generators 250 and 252 respectively associated therewith. The output voltages from the tachometer-generators are taken to a summing amplifier 256 and are there compared with a speed demand voltage from the potentiometer 254 (if the system of FIGURE 7 were incorporated in the system of FIGURE 6 potentiometer 254 would be represented by the potentiometer 135).

The error signal output from the amplifier 256 is fed back to control the variable displacement pump stroke via a servo transducer 258. Control of the pump stroke by such means has been described in connection with FIGURE 6 and the description will not be repeated here. A potentiometer 260 operatively attached to the pump stroke actuator feeds back a voltage to the summing amplifier 10 thus providing for interstage feed back.

The voltages produced by the tachometer-generators 250 and 252 are also fed to a further summing amplifier 262, with one of the generator output voltages first having been passed through a sign reverser 264. The amplifier 262 is also fed a voltage proportional to the difference in speed required between the two fluid driven motors and this voltage is provided by means of a potentiometer 266 the wiper arm of which is set manually by the operator in accordance with the speed differential required. The voltage output from the potentiometer 266 can be plus VE or minus VE depending on the speed difference required.

The output voltage from the summing amplifier 262 is proportional to the difference between the hydraulic motor differential speed and the differential speed desired; this output signal is taken to a servo transducer 268 which in turn controls the flow of hydraulic fluid to the servo powered differential throttle 270 (the latter would replace the differential throttle 157 in the system of FIGURE 6). A potentiometer 272 is operatively connected to the differential throttle actuator thereby to feed back a signal representative of the throttle position to the summing amplifier 262 for purposes of interstage feed back.

The system described above is capable of maintaining a predetermined speed differential between the fluid driven motors. There is no need for the operator to have any concept of the actual loads being carried by the separate motor systems in order to maintain such differential.

We claim:

1. A power transmission system comprising:
   (a) a plurality of fixed displacement pumps for pumping a working fluid at rates proportional to the speeds at which they are driven,
   (b) a source of working fluid for said pumps,
   (c) a prime mover for driving said fixed displacement pumps at speeds which may be subject to random variations,
   (d) at least one fluid driven motor adapted to receive working fluid from said fixed displacement pumps and being driven at a rate proportional to the flow rate of the working fluid passing therethrough,
   (e) fluid conductor means establishing connection between the outlets of the fixed displacement pumps and the inlet of said fluid driven motor,
   (f) valve means connected to said fluid conductor means in advance of said fluid driven motor adapted to permit the flow output of at least one of said fixed displacement pumps to escape from the fluid conductor means and return to said source of working fluid without passing through said motor in response to a signal fed to said valve means, hence effectively varying the number of pumps feeding working fluid to said motor,
   (g) and a control means for said valve means, said control means including:
      (i) means producing a first signal representative of a preselected motor speed setting and hence a desired flow rate of the working fluid, and
      (ii) means producing a second signal representative of the rate at which the fixed displacement pumps are driven,
      (iii) means sensitive to a differential between said first and second signals and emitting an error signal in response thereto,
   (h) and means for feeding said error signal to the valve means thereby to actuate the latter to effectively vary the number of constant displacement pumps feeding the working fluid to said motor means, such variation being in a sense tending to reduce said error signal as closely as possible to a null value.

2. A power transmission system as defined in claim 1, including a further flow varying means responsive to any remaining difference between the actual flow rate and the desired flow rate after the number of pumps feeding working fluid to the motor has been varied by the said control means, said further flow varying means acting in response to any such remaining difference to reduce the latter substantially to a zero value.

3. A power transmission system according to claim 2, wherein said further flow varying means includes a variable restriction in said fluid conductor means downstream of said valve means whereby the flow from said pumps passes therethrough, and a fluid bypass line having one end connected to said conductor means intermediate said valve means and said variable restriction and with its other end connected to said source of fluid, and a bypass valve connected in said bypass line and having valve actuating means associated therewith responsive to the pressure drop across said variable restriction whereby increasing flow through said variable restriction opens said valve to bypass more fluid back to said source and vice versa.

4. A power transmission system according to claim 2, wherein said further flow varying means comprises variable fluid flow restriction means in said fluid conductor means, a variable displacement pump connected to said prime mover and having its inlet connected to the source of working fluid and having its outlet connected to said fluid conductor means whereby the flow output of the variable displacement pump adds to the flow output of the fixed displacement pump, said variable displacement pump including actuator means for varying the displacement and hence the flow output thereof, means sensitive to a pressure drop across said restriction operatively connected to said actuator means and acting in response to pressure differential changes to vary the output of the variable displacement pump to maintain the pressure differential across said restriction at a substantially constant value.

5. A power transmission system according to claim 3, wherein a plurality of said fluid driven motors are provided, each said fluid driven motor having its inlet connected to said fluid conductor means, and for each of said motors there being provided a variable restriction with the latter all being connected in parallel in said fluid conductor means.

6. A power transmission system according to claim 2 wherein said further flow varying means comprises a bypass valve connected to said fluid conductor downstream of said valve means and having a bypass line connected thereto and to said source of working fluid and arranged to divert a portion of the fluid flowing in said fluid conductor back to said source in response to a signal fed to the bypass valve, means for generating a third signal representative of the output speed of said motor means, means for comparing said third signal with said first signal, said comparing means constructed and arranged to emit a further signal in response to a difference between the compared signals and means feeding said further signal to said bypass valve means to actuate the latter to divert a portion of the flow away from said motor means thereby to reduce the further signal emitted by said comparing means to a null value.

7. A power transmission system according to claim 2 wherein said further flow varying means comprises; a variable displacement pump driven from said prime mover and having its inlet connected to said source, and its outlet connected in said fluid conductor whereby the flow output of said variable displacement pump supplements the flow output of said fixed displacement pumps, means for generating a third signal representative of the output speed of said motor means, means responsive to said first signal and to said third signal and producing an error signal responsive to the difference therebetween, said variable displacement pump including actuator means responsive to said error signal to vary the displacement of the pump, and means feeding said error signal to said actuator means whereby the output of said variable displacement pump is varied in a sense as to reduce the error signal to a null value.

8. A system for delivering a desired flow of fluid from a source to a user comprising:
   (a) a plurality of pumps each arranged to pump fluid at a rate proportional to the rate at which the pump is driven and connected to said source;
   (b) means for driving said pumps;
   (c) control means for producing control signals including:
      (i) means producing a first signal representing a desired fluid flow rate to said user,
      (ii) means producing a second signal representing the rate at which said pumps are driven by said driving means,
      (iii) and means effecting a comparison between said first and second signals and emitting said control signals in response to a difference between said signals,
   (d) means connecting the outlets of said pumps to said user and responsive to said control signals to selectively bypass the output of one or more of said pumps away from said user thereby to vary the number of pumps feeding fluid to said user and to vary the rate of fluid flow to said user in a sense as to reduce said control signal to a null value, whereby said pumps deliver fluid at a rate approximating said desired rate to said user regardless of the rate at which said pumps are driven.

9. A system according to claim 8 including a further flow varying means sensitive to any remaining difference between said desired flow rate and the actual flow rate to said user after the number of pumps feeding fluid to said user has been selected by said control means and responding to any such difference to reduce the latter substantially to a zero value.

10. A system according to claim 9 wherein said further flow varying means comprises means for generating a third signal representing the actual rate of flow to said user, means for comparing said third signal with said first signal and emitting an error signal in response to a difference therebetween, and valving means associated with said connecting means and responding to said error signal to divert a sufficient portion of the fluid flowing towards said user back to said source thereby to reduce the difference between the first and third signals and cause said error signal to approach a null value whereby the actual flow rate to the user substantially equals said desired flow rate.

11. A system according to claim 9 wherein said further flow varying means comprises; means throttling the flow passing to said user, means sensitive to the pressure drop across said throttling means and emitting a signal in response thereto, and means responsive to said signal to vary the flow passing to said user in a sense causing said signal to approach a null value.

12. A system according to claim 11 wherein the means responsive to said signal comprises a signal responsive fluid bypass valve arranged to divert a portion of the fluid flowing towards said user back to said source in response to said signal thereby to reduce the actual flow rate to a value corresponding to said desired flow rate.

13. A system according to claim 11 wherein the means responsive to said signal comprises a variable displacement pump connected to said driving means and arranged to pump fluid from said source to said user, said variable displacement pump having actuator means for varying the displacement and hence the flow output thereof in response to said signal in a sense as to cause the latter to approach a null value.

14. A system according to claim 9 wherein said further flow varying means comprises; means generating a third signal representing the actual flow rate of fluid to said user, means effecting a comparison between said first and third signals and emitting an error signal in response to a difference between said signals, and valving means associated with the means connecting the outlets of said pump to said user and responding to said error signal to divert a sufficient portion of the fluid back to said source to cause said error signals to approach a null value.

15. A system according to claim 9 wherein said further flow varying means comprises: means generating a third signal representing the actual flow rate of fluid to said user, means effecting a comparison between said first and third signals and emitting an error signal in response to a difference between said signals, and a variable displacement pump connected to said driving means and arranged to pump said fluid from the source to said user, said variable displacement pump having actuating means associated therewith responsive to said error signal for varying the displacement of the pump and hence the flow output thereof in a sense as to reduce said error signal to a null value.

16. In a fluid transmission system including a prime mover the combination comprising: a plurality of pump means driven from said prime mover for delivering a flow volume at a rate proportional to the rate at which they are driven, fluid motor means adapted to be driven at rates responsive to the flow rate of fluid therethrough, conduit means establishing a fluid flow path between the pump means and the fluid motor means, valving means associated with said conduit means, said valving means arranged to respond to control signals fed thereto to selectively permit the outlet flow of at least one of said pump means to bypass the fluid motor means thereby to vary the total flow to said motor means and hence vary the speed of the latter, means producing a signal representing the speed at which the pumps are driven by the prime mover, means producing a signal representing a desired fluid motor speed, and a control system sensitive to a difference between the signal representing the speed at which the pump means are driven by the prime mover and the signal representing a desired fluid motor speed and responding thereto to produce said control signals and supply same to said valving means to selectively actuate same and hence effectively vary the number of pumps feeding fluid to said motor means in a sense as to reduce the difference between said signals.

17. The system according to claim 16 wherein said pumping means includes a plurality of positive displacement pumps.

18. The system according to claim 17 wherein said valving means comprises solenoid actuated bypass valves connected in the respective outlets of several of said positive displacement pumps, said bypass valves arranged to divert the flow output of the pump associated therewith away from said fluid motor means in response to said control signals.

19. The system according to claim 18 wherein one of said pumping means comprises a variable displacement pump, and a further control means sensitive to a difference between the actual flow rate to said motor means and a preselected flow rate and emitting a control signal in response thereto, said variable displacement pump including actuating means sensitive to said control signal and responding thereto to increase or decrease flow output of said pump thereby to reduce the control signal from said further control means to a null value.

20. The system according to claim 19 comprising a further bypass valve connected in said conduit means in advance of said motor means, said further bypass valve means constructed and arranged to respond to a control signal fed thereto to divert a selected amount of the combined flow output of said pumping means away from said motor means, and means for producing said control signal comprising means producing a first signal representing a desired motor speed setting, means producing a second signal representing an actual motor speed, and means for comparing the first and second signals to produce said control signal, said valve means being actuated by said control signal in a sense as to reduce said control signal to a null value.

21. A system according to claim 16 further comprising a plurality of said fluid driven motor means, and differential throttle means positioned in the fluid conduit means leading to said plurality of motor means and having control means associated therewith to provide differential speed operation of the respective motor means.

22. A system according to claim 21 further including valving means arranged to reverse the flow of fluid through said individual motor means thereby to reverse the output motion of the latter.

23. A system according to claim 21 further comprising means for maintaining a preset speed differential between the respective motor means.

References Cited

UNITED STATES PATENTS

| 2,276,895 | 3/1942 | Vosseler et al. | 60—53 XR |
| 2,867,091 | 1/1959 | Orloff et al. | |
| 3,038,312 | 6/1962 | Marsh. | |

EDGAR W. GEOGHEGAN, *Primary Examiner.*

U.S. Cl. X.R.

60—53